Patented Feb. 14, 1933

1,897,379

UNITED STATES PATENT OFFICE

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE

METHOD OF REFINING ROSIN

No Drawing.   Application filed August 11, 1928. Serial No. 299,128.

My invention relates to an improved method for refining rosin and may be adapted to the refining of both gum and wood rosin, though it will be found especially advantageous in the refining of wood rosin, such for example, as is extracted by means of a suitable solvent from stump wood, after the removal therefrom of the turpentine and pine oil as by distillation with steam.

Both wood and gum rosin generally contain, as is well known, coloring matter and color bodies, the presence of which is highly disadvantageous where the rosin is used for certain purposes and which render the rosin of reduced value as compared to rosin of the highest natural grade, or that from which the coloring matter and color bodies have been removed. Wood rosin generally, and to a limited extent, certain types of gum rosin, contain what may be termed latent color bodies, or color bodies which are not observable, or do not appreciably discolor the rosin as originally produced, but which under certain circumstances, as when the rosin is exposed to the action of oxygen in the presence of an alkali, turn dark and discolor the rosin, or the product in which it is contained. As a result of the presence of such latent color bodies in wood rosin, such has not been available for use in the production of products normally containing an alkali and which in use are exposed to the air, such as limed varnishes, soaps, sizes, etc., where a high grade product which will retain its color, or lack of color, is desired.

Now, it is the object of my invention to provide a novel method whereby either wood or gum rosin may be refined by the removal therefrom of coloring matter and color bodies, with the removal in addition of latent color bodies from wood rosin.

In accordance with my invention, from the broad standpoint, the rosin to be refined is subjected to treatment with methanol (methyl alcohol). More particularly, the rosin to be refined is placed in solution in a suitable solvent and then subjected to treatment with methanol, or, conversely, the rosin is first dissolved in methanol and refined rosin extracted therefrom with a suitable solvent. Wood rosin may be given additional refining by distillation, or agitated, while in solution in the solvent, with a substance, as fuller's earth, activated carbon or the like, after treatment with methanol.

In the practical adaptation of my invention, I may use various solvents for the rosin which are immiscible with methanol at normal or reduced temperatures such as say 0° C.–15° C., or below, for example, various petroleum distillates, as gasoline, mineral spirits, kerosene, petroleum ether, or substances such as carbon disulphide, pinene, dipentene, turpentine, para-cymene, para-menthane, etc. and where the methanol used contains water, I may use carbon tetrachloride, benzene, or toluene, and it will be understood that my invention contemplates and includes the use of any solvents for the rosin which will be operable in my process, though I preferably use a petroleum hydrocarbon. In addition to fuller's earth and activated carbon, I contemplate the use, as equivalents, of any other substances operably substitutable therefor in my process.

As illustrative of the practical adaptation of the method in accordance with my invention, for example 700 parts of a gasoline solution of ordinary wood rosin, containing 13.5% rosin, is added to 200 parts by weight of methanol. The gasoline-rosin solution and the methanol will be found to be miscible at about 25° C., and if the process is carried out at or above such temperature, the methanol will go into solution in the gasoline-rosin solution. On cooling the solution to about −3° C. it will separate into two layers, an upper layer, comprising about 563 parts by weight, mainly gasoline, will be yellow in color and will yield about 44 parts by weight of light colored or refined rosin on separation from the lower layer and distillation off of the gasoline. The lower layer, comprising about 427 parts by weight and including both methanol and some gasoline, will be reddish brown in color and will give, on separation from the upper layer and distillation off of the methanol and gasoline, about 49 parts by weight of dark colored rosin. The rosin obtained from the upper layer, as in the foregoing example, may be varied in quality by varying the relative proportion of rosin, gasoline and methanol from that indicated, or by separating at higher or lower temperatures from those indicated. It will also be appreciated that the rosin may be distilled before treatment with methanol and gasoline. The rosin obtained from the upper layer described above will be substantially refined as compared with the rosin treated, but may be further refined by distillation, or by agitating the gasoline-rosin solution with, for example, fuller's earth, activated carbon, or the like, and filtering before distillation off of the gasoline. For example, the rosin recovered from the upper layer solution may be distilled under pressure of say 5 mm.–15 mm. mercury in a bath at say 250° C.–290° C. with the production of a rosin which will be adaptable for use in high grade soaps, varnishes, sizes, etc.

As an alternative procedure, for example, 200 parts by weight of wood rosin are dissolved in 800 parts by weight of methanol and the solution extracted with 600 parts by weight of gasoline, separation being effected at $-10°$ C. The upper layer, or gasoline solution, is separated from the lower layer and then desirably extracted with 150 parts by weight of methanol. Separation is effected at $-10°$ C. and the upper layer, on separation from the lower layer and distillation off of the gasoline, will yield 89 parts by weight of refined rosin. This refined rosin may be further refined by distillation at say 250° C.–270° C. at 10 mm. mercury pressure and will yield about 82 parts by weight of highly refined rosin. The refined rosin may also be improved by agitation with fuller's earth, activated carbon, or the like, followed by filtration, before distillation off of the gasoline. When in the carrying out of the process according to my invention, the gasoline-rosin solution is agitated with fuller's earth or activated carbon after treatment with methanol, for example, say 20% of activated carbon, or 50% of fuller's earth, by weight of the rosin, will give the desirable results.

In the above illustration of the practical adaptation of the process according to my invention, the methanol used is substantially anhydrous, but the use of anhydrous methanol is not essential and in fact if some water be present, say, for example, from 2%–8%, better separation between the gasoline and methanol layers will be obtained.

In connection with the practical adaptation of my invention, and as alternative to the illustration given above, the rosin may be refined by crystallization from the methanol without the use of any solvent for the rosin other than the methanol. For example, 300–400 parts by weight of rosin are dissolved in about 100 parts of methanol with the aid of heat, say at a temperature of about 50° C.–65° C. The methanol-rosin solution is then cooled, say to a temperature of about 0° C.–25° C. and a purified grade of rosin will crystallize out of the solution and may be filtered from the mother liquor.

When the rosin is purified by crystallization from methanol, it is preferably first distilled, which will partially purify the rosin and will cause it to crystallize from the methanol more readily. Further, the crystallized rosin is desirably washed with methanol during filtration in order to free it from the mother liquor. For example, about 390 parts by weight of distilled wood rosin are dissolved in 100 parts by weight of methanol by heating. The solution formed is cooled to room temperature, say 20° C. and the crystallized rosin filtered off being washed on the filter with about 100 parts by weight of methanol. After drying about 140 parts by weight of purified rosin, A. N. about 185 and in reality a high grade abietic acid rather than rosin and which will not discolor in the presence of an alkali and air, as in a soap, is obtained. Additional amounts of purified rosin may be obtained by concentrating the mother liquor.

In connection with the practical application of the method in accordance with my invention, it will be noted that methanol will dissolve to some extent in petroleum distillates and at certain temperatures will go into solution therein. However, if relatively large proportions of methanol are used, as compared with the gasoline-rosin solution, the system will separate into two layers on cooling to approximately 0° C.

It will be understood that the method in accordance with my invention relates essentially to the refining of rosin by the use of methanol and that it is applicable to both wood and gum rosin, though it is of more particular advantage in the removal of latent color bodies from wood rosin. It will be understood that my invention is not limited to the use of any particular temperatures, proportion of methanol and rosin solvent and that my invention contemplates the use of any solvent for the rosin which may be operable in my process, though, as has been indicated, petroleum hydrocarbons are preferred.

Having now fully described my invention, what I claim and desire to protect by Letters Patent is:

1. The step in the method of refining wood rosin containing color bodies which includes subjecting wood rosin containing color bodies to treatment with methanol for the removal of color bodies therefrom.

2. The method of refining rosin containing color bodies which includes subjecting rosin containing color bodies to treatment with methanol and color bodies dissolved thereby, separating the treated rosin from the methanol and distilling the rosin.

3. The method of refining wood rosin containing latent color bodies which includes subjecting wood rosin containing latent color bodies to distillation, subjecting the distillate to treatment with methanol and separating the treated rosin from the methanol and latent color bodies dissolved thereby.

4. The method of refining wood rosin containing latent color bodies which includes subjecting wood rosin containing latent color bodies to distillation, dissolving the distillate in methanol and crystallizing rosin from the methanol and latent color bodies dissolved thereby.

5. The step in a method of refining rosin containing color bodies which includes subjecting rosin containing color bodies in solution in a solvent substantially immiscible with methanol at or below normal temperature to treatment with methanol for the removal of color bodies therefrom.

6. The step in a method of refining rosin containing color bodies which includes subjecting rosin containing color bodies in solution in a solvent substantially immiscible with methanol at or below normal temperature to treatment with methanol containing water for the removal of color bodies therefrom.

7. The method of refining rosin containing color bodies which includes subjecting rosin containing color bodies in solution in a solvent substantially immiscible with methanol at or below normal temperature to treatment with methanol, separating methanol and color bodies dissolved thereby from the rosin-solvent solution, and recovering rosin from the rosin-solvent solution.

8. The method of refining rosin containing color bodies which includes subjecting rosin containing color bodies in solution in a solvent substantially immiscible with methanol at or below normal temperature to treatment with methanol, separating methanol and color bodies dissolved thereby from the rosin-solvent solution, recovering rosin from the rosin-solvent solution and distilling the rosin.

9. The method of refining rosin containing color bodies which includes subjecting rosin containing color bodies in solution in a solvent substantially immiscible with methanol at or below normal temperature to treatment with methanol, separating methanol and color bodies dissolved thereby from the rosin-solvent solution, agitating the rosin-solvent solution with fuller's earth and recovering rosin from the rosin solution.

10. The method of refining rosin containing color bodies which includes dissolving rosin containing color bodies in a solvent therefor, which is substantially immiscible with methanol at or below normal temperature, adding methanol to the rosin-solvent solution, separating methanol and color bodies dissolved thereby from the rosin-solvent solution and recovering rosin from the rosin-solvent solution.

11. The method of refining rosin containing color bodies which includes dissolving rosin containing color bodies in a solvent therefor, which is substantially immiscible with methanol at or below normal temperature, adding methanol to the rosin-solvent solution, cooling the rosin-solvent solution to approximately 0° C., separating methanol and color bodies dissolved thereby from the rosin-solvent solution and recovering rosin from the rosin-solvent solution.

12. The method of refining rosin containing color bodies which includes dissolving rosin containing color bodies in gasoline, adding methanol to the gasoline-rosin solution, separating methanol and color bodies dissolved thereby from the gasoline-rosin solution and recovering rosin from the gasoline-rosin solution.

13. The method of refining rosin containing color bodies which includes dissolving rosin containing color bodies in a solvent therefor, which is substantially immiscible with methanol at or below normal temperature, adding methanol to the rosin-solvent solution, separating methanol and color bodies dissolved thereby from the rosin-solvent solution, recovering rosin from the rosin-solvent solution and distilling the rosin.

14. The method of refining rosin containing color bodies which includes dissolving rosin containing color bodies in a solvent therefor, which is substantially immiscible with methanol at or below normal temperature, adding methanol to the rosin-solvent solution, separating methanol and color bodies dissolved thereby from the rosin-solvent solution, agitating the rosin-solvent solution with fuller's earth, filtering the rosin-solvent solution and recovering rosin from the rosin-solvent solution.

15. The step in the method of refining rosin containing latent color bodies, which includes subjecting rosin containing latent color bodies to treatment with methanol for the removal of latent color bodies therefrom.

16. The method of refining wood rosin containing latent color bodies which includes subjecting wood rosin containing latent color bodies in solution is a solvent substantially immiscible with methanol at or below normal temperature to treatment with methanol, separating methanol and latent color bodies dissolved thereby from rosin-solvent solution and recovering rosin from the rosin-solvent solution.

In testimony of which invention, I have hereunto set my hand, at Kenvil, N. J., on this 26th day of July, 1928.

IRVIN W. HUMPHREY.